United States Patent [19]

Wills

[11] Patent Number: 5,415,333

[45] Date of Patent: * May 16, 1995

[54] SKI CARRIER

[76] Inventor: James H. Wills, 12170 Ivywood St. NW., Coon Rapids, Minn. 55433

[*] Notice: The portion of the term of this patent subsequent to Feb. 11, 2011 has been disclaimed.

[21] Appl. No.: 22,711

[22] Filed: Feb. 24, 1993

Related U.S. Application Data

[63] Continuation-in-part of Ser. No. 862,804, Apr. 3, 1992, Pat. No. 5,285,942.

[51] Int. Cl.$^6$ ............................................. B60R 9/00
[52] U.S. Cl. .................................... 224/328; 224/309; 224/315; 224/917
[58] Field of Search ............... 224/315, 328, 917, 309; 206/315.1, 443, 315.2, 315.3, 315.4; 220/8, 4.22, 306, 503; 190/103, 104, 105, 19, 20

[56] References Cited

U.S. PATENT DOCUMENTS

| | | | |
|---|---|---|---|
| 910,108 | 1/1909 | Alston | 206/443 |
| 2,412,162 | 12/1946 | Lindblom | 224/29 |
| 2,475,961 | 7/1949 | Hilbert | 190/47 |
| 3,521,810 | 7/1970 | Boyer | 229/23 |
| 3,744,687 | 7/1973 | Oreck | 224/2 A |
| 3,767,036 | 10/1973 | McLeod | 206/16 R |
| 3,837,548 | 9/1974 | Nerger | 224/45 S |
| 3,895,696 | 7/1975 | Urushibara | 190/18 A |
| 3,909,031 | 9/1975 | Schmaedeke | 280/11.37 K |
| 3,921,871 | 11/1975 | Heil | 224/45 S |
| 4,071,176 | 1/1978 | Tuzee | 224/42.1 E |
| 4,084,735 | 4/1978 | Kappas | 224/42.1 E |
| 4,161,268 | 7/1979 | Heil | 224/45 S |
| 4,171,759 | 10/1979 | Wnek | 224/45 S |
| 4,238,063 | 12/1980 | O'Dair | 224/45 S |
| 4,402,355 | 9/1983 | Wymore et al. | 150/52 R |
| 4,509,656 | 4/1985 | Rösler | 220/8 |
| 4,643,302 | 2/1987 | Baumgardner | 206/315.1 |
| 4,860,935 | 8/1989 | Paylinsky | 224/202 |
| 4,867,307 | 9/1989 | Bovee | 206/315.1 |
| 4,867,361 | 9/1989 | Burnham | 224/310 |
| 4,953,773 | 9/1990 | Wirth | 224/328 |
| 5,285,942 | 2/1994 | Wills | 224/328 |

*Primary Examiner*—Henry J. Recla
*Assistant Examiner*—David J. Walczak
*Attorney, Agent, or Firm*—Kinney & Lange

[57] ABSTRACT

A ski carrier for alternatively transporting skis by manually carrying, by a vehicle mounting the ski carrier therein, or by a common carrier. The ski carrier has a case having a cover portion and a holder portion, and an end cap positionable over an opening in a first end of the case when the cover and holder portions thereof are closed.

31 Claims, 12 Drawing Sheets

SKI CARRIER

This is a continuation-in-part of application Ser. No. 07/862,804, filed on Apr. 3, 1992, now U.S. Pat. No. 5,285,942.

BACKGROUND OF THE INVENTION

The present invention concerns ski carriers and, more particularly, a ski carrier that can be alternatively transported manually or by vehicle through being mounted thereon.

To enjoy a day of skiing, most skiers must travel to a skiing facility and must transport their skis from their home or lodging to the skiing facility. Many skiers travel to the skiing facility by automobile and must therefore have a ski carrier capable of carrying skis on the automobile. Once at the skiing facility, parking is often a substantial distance from the ski slopes. Therefore, there is a need for a ski carrier that permits the manual carrying of skis from the automobile to the slopes. In addition, automobile travel to a skiing facility is often preceded by an airplane flight which imposes varied demands on a ski carrier both for carrying and as baggage.

A number of types of vehicle-mounted ski carriers are available for transporting skis. In addition, a number of types of ski carriers are available for manually transporting skis. However, a ski carrier convenient for vehicle-mounting is often inconvenient as a manual ski carrier.

A typical ski carrier is shown in U.S. Pat. No. 4,171,759 to Wnek. This ski carrier, as with many other vehicle-mounted ski carriers, requires a relatively permanently mounted bracket on the vehicle. Vacationing skiers, not uncommonly, rent an automobile on which they wish to carry skis. Therefore, having a ski carrier which can be mounted on an automobile without the use of any complicated or relatively permanent additional mounting devices is much desired.

Many vehicle-mounted ski carriers expose skis to rain, wind, salt and object impacts due to following cars, causing damage to the skis. Hence, there is a substantial advantage in having a ski carrier that completely encloses and thus protects the skis. Particularly of further advantage, enclosing with a relatively rigid structure obviates the need to individually wrap skis to prevent edge damage during baggage handling during the course of airplane travel. Also, a ski carrier should be designed such that it cannot open accidentally, resulting in a pile of skis and poles on the ground or, worse yet, on the road. Further, the carrier should be lockable to secure the skis to a significant extent against theft.

SUMMARY OF THE INVENTION

The present invention provides a ski carrier for alternatively transporting skis by manual carrying, by a vehicle mounting the ski carrier thereon, or by a common carrier. The ski carrier comprises a case having a cover portion and a holder portion, and an end cap positionable over an opening in the first end of the case when the cover and holder portions thereof are closed.

The cover and holder portions of the case can be attached at a side of each so that the case can conveniently be placed in either an open or a closed position to permit putting skis therein when the case is in the open position and at least partially enclosing such skis when the case is in the closed position. When in the closed position, the case has the general shape of an elongated container having an opening at the first end thereof.

The end cap also has the general shape of a somewhat elongated container having an opening at one end thereof larger than the closed case and having a rigid, unitary wall therearound. If the case is in the closed position, the end cap can be slid over the first end of the case to prevent any significant opening of the case cover and holder portions from the closed position. A plurality of parallel ridges on the cover and holder portions of the case are received by a plurality of elongated recesses in the end cap in a detent-like arrangement to aid in holding the end cap in place aligned with the case. The end cap can be secured by a bolt insertable through a pair of holes in the end cap and through a selected matching one of a plurality of locking holes in the case.

DETAILED DESCRIPTION OF THE PREFERRED EMBODIMENTS

Figure 1:
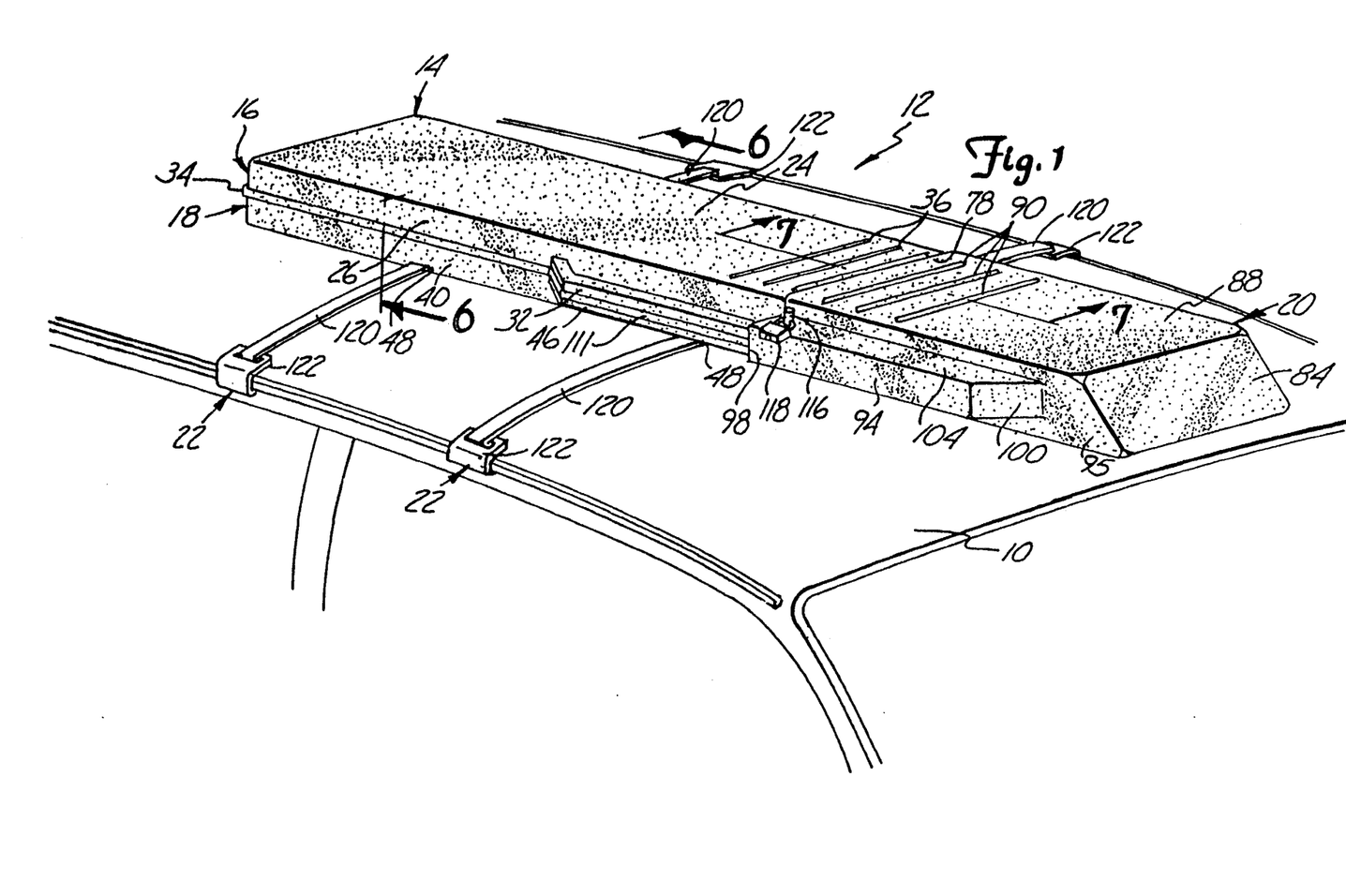
FIG. 1 shows a pictorial view of the assembled ski carrier of the present invention mounted on a vehicle.

A vehicle, 10, having a ski carrier, 12, of the present invention mounted thereon is shown in FIG. 1. Ski carrier 12 comprises a case, 14, having a cover portion, 16, and a holder portion, 18, an end cap, 20, and two strap assemblies, 22. Cover portion 16, holder portion 18, and end cap 20 are each fabricated from a suitable molded polymer.

Figure 5:
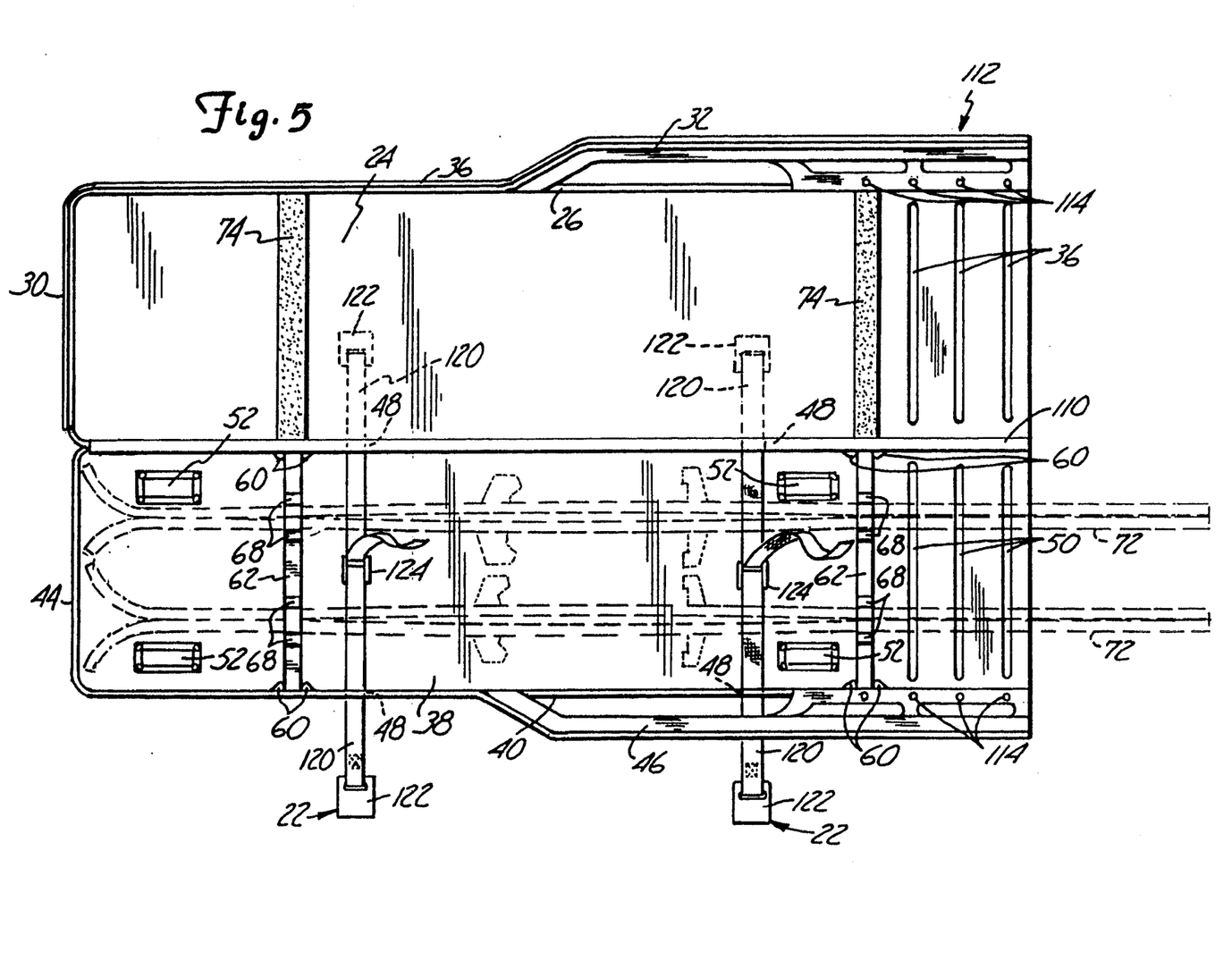
FIG. 5 shows a top view of the case portion of the present invention in an open position.

Cover portion 16 and holder portion 18 of case 14 are shown attached to one another in the side-by-side positioning thereof in FIG. 5. Cover portion 16 of case 14 has the general shape of an elongated half container having a generally rectangular cover major wall, 24, a first side, 26, a second side, 28, and an end, 30. A handle portion, 32, protrudes from and extends along first side 26. Cover portion 16 also has a lip, 34, which extends beyond the edges of first side 26, end 30, and handle portion 32. No end is provided across cover major wall 24 opposite end 30, leaving an open end in cover portion 16. A plurality of outwardly protruding, equally spaced, elongated parallel ridges, 36, are molded into cover major wall 24, such that there are recesses in the inner surface thereof, and extend perpendicular to both first side 26 and second side 28.

Holder portion 18 of case 14 is substantially the same size as cover portion 16 viewed from the top in FIG. 5, and also has the general shape of an elongated half container having a generally rectangular holder major wall, 38, a first side, 40, a second side, 42, and an end, 44. No end is provided across holder major wall 38 opposite end 44, leaving an open end in holder portion 18. A handle portion, 46, protrudes from and extends along first side 40. First side 40 and second side 42 of holder portion 18 each have two openings, 48, therein located such that those openings 48 in first side 40 are located directly opposite those openings 48 in second side 42. A plurality of outwardly protruding, equally spaced, elongated parallel ridges, 50, are molded into holder major wall 38, such that there are recesses in the inner surface thereof, and extend perpendicular to both first side 40 and second side 42.

A plurality of outwardly protruding, generally rectangular supports, 52, are molded into holder major wall 38. Supports 52 are seen from the top in FIG. 5, but are better seen in FIG. 6. Each support 52 has a pad, 54, attached to an outer surface, 56, of support 52, and has a hole, 58, to permit liquid, such as melted snow, to drain from holder portion 18 of case 14.

Four pairs of holder bracket ridges, 60, protrude inwardly from holder portion 18 with two pairs protruding from each of first side 40 and second side 42. All holder bracket ridges 60 are substantially perpendicular to holder major wall 38 in direction of extent, i.e. vertically oriented in FIG. 6. Members of each pair of holder bracket ridges 60 are spaced apart from one another. Two metal brackets, 62, are inserted in holder portion 18, each end of each bracket 62 being positioned in one of the spaces between a corresponding pair of holder bracket ridges 60. A straight side, 64, of each bracket 62 is in or near contact with holder major wall 38. A first side 66, of each bracket is positioned between a pair of holder bracket ridges 60 protruding inward from first side 40. A second side, 67, of each bracket is positioned between an opposing pair of holder bracket ridges 60 protruding inward from second side 42.

Figure 6:
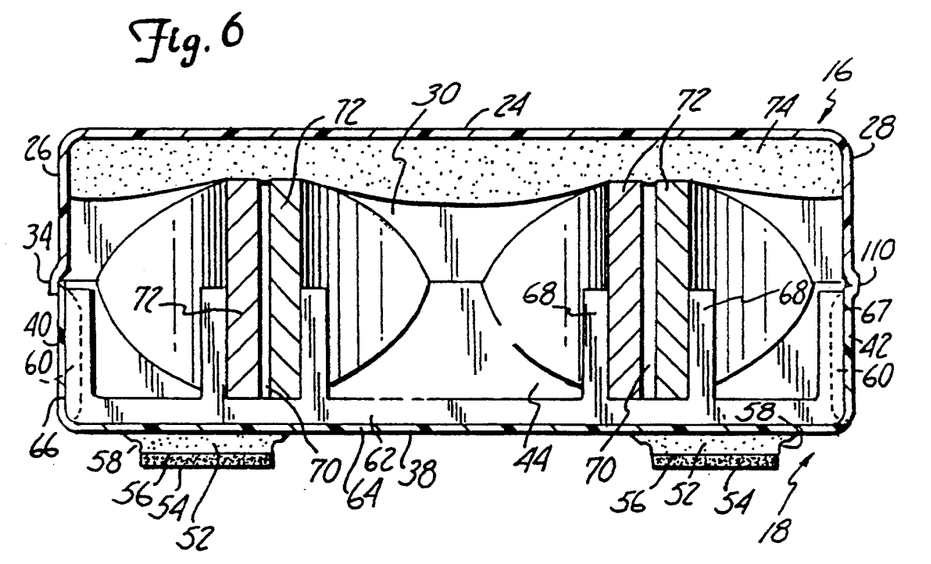
FIG. 6 shows a cross sectional view of the case portion taken along the line 6—6 of FIG. 1.

Each bracket 62 has two pairs of upward extending, spaced apart columns, 68, having rectangular cross sections. Each pair of columns 68 forms between them a slot, 70, in which a pair of skis, 72, may be inserted. Columns 68 secure skis 72 between them to tend to prevent them from slapping against one another, or sliding back and forth in contact with one another, to result in scratching of ski surfaces. Also, ski poles may be wedged between columns 68 and skis 72 for transport in case 14. Two foam strips, 74, are attached to cover major wall 24, with each strip 74 positioned in cover portion 16 such that it is directly opposite each bracket 62 in holder portion 18 if cover portion 16 and holder portion 18 are closed against one another as shown in FIGS. 1 and 6.

Figure 4:
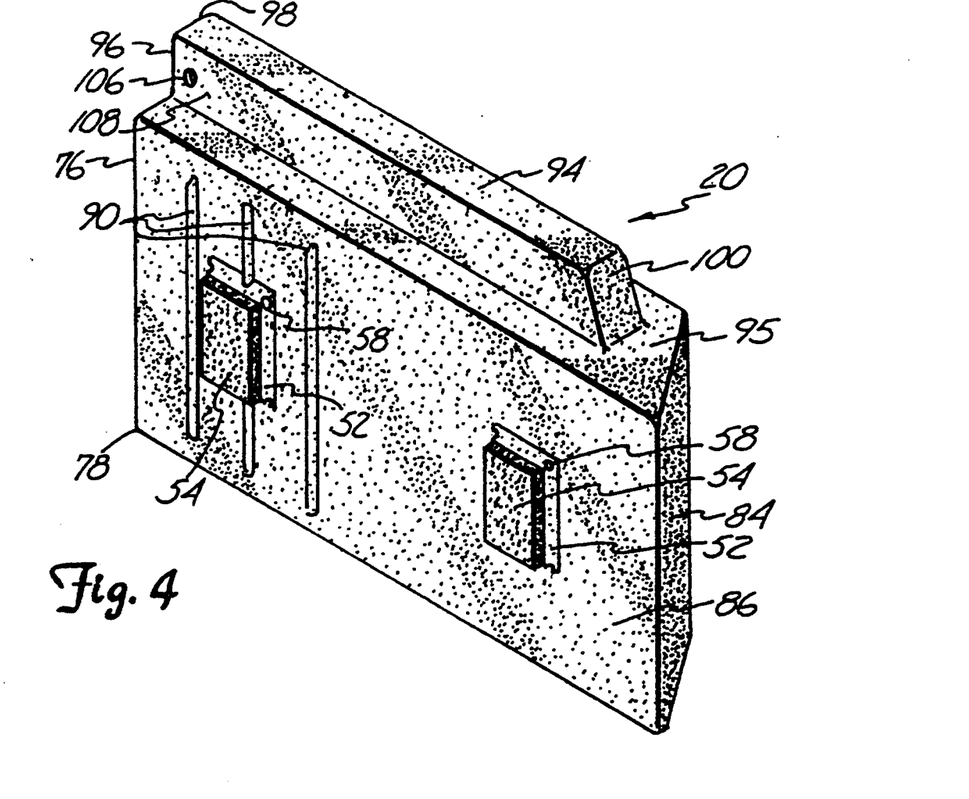
FIG. 4 shows a pictorial view of the end cap portion of the present invention.

End cap 20 is shown separately in FIG. 4 rather than as assembled with case 14 as in FIG. 1 and has the general shape of a somewhat elongated container having an end opening, 76, in a first end 78. A second end, 84, of end cap 20 is acutely angled with respect to a cap support major wall, 86, shown in FIG. 4, and obtusely angled with respect to an opposite cap containment major wall, 88, shown in FIG. 1, to minimize the air resistance of ski carrier 12 encountered in facing forward on a moving vehicle. Two supports 52 are molded into cap support major wall 86. Each support 52 has a pad 54 attached to its outer surface 56 and has an opening 58 that permits liquid in end cap 20 to be drained.

Figure 7:
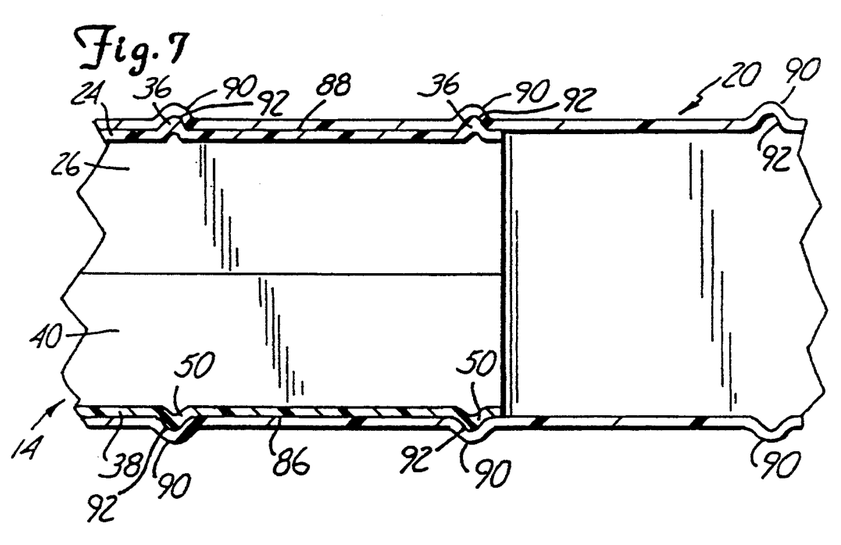
FIG. 7 shows a cross sectional view of a part of both the case and the end cap portions of the ski carrier taken along the line 7—7 of FIG. 1.

End cap 20 is shown with case 14 inserted therein in FIG. 7. Both cap containment major wall 88 and cap support major wall 86 have a plurality of outwardly protruding, equally spaced, elongated parallel ridges, 90, molded therein such that there are recesses, 92, in the inner surfaces thereof. Each recess 92 in one of these inner surfaces is directly across from a recess 92 in the other inner surface. Each recess 92 has a shape that permits one of ridges 36 in cover portion 16 and an opposite one of ridges 50 in holder portion 18 to be nestled therein with end cap 20 slid over the open ends of cover and holder portions 16 and 18 of case 14 so as to tend to keep end cap 20 aligned with case 14.

Figure 3:
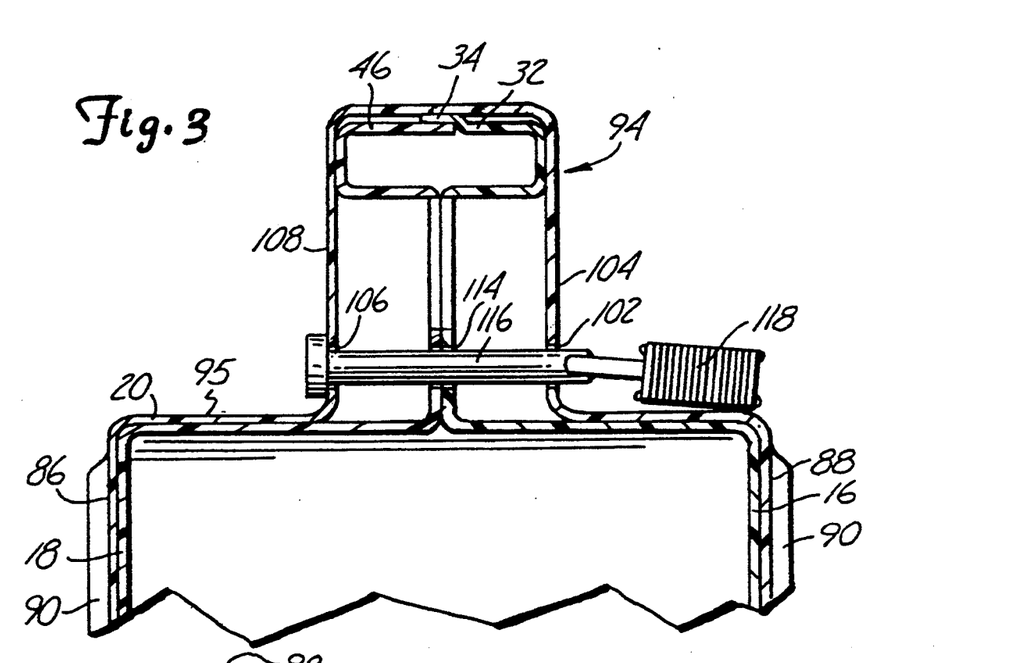
FIG. 3 shows a cross sectional view taken along the line 3—3 of FIG. 2.

A handle cap, 94, shown in FIG. 4, protrudes from a first side, 95, of end cap 20 and provides additional space in end cap 20 so that handle portion 32 of cover portion 16 and handle portion 46 of holder portion 18 can be received therein. Handle cap 94 has an end opening, 96, at a first end, 98, that is flush with first end 78 of end cap 20. A second end, 100, of handle cap 94 is acutely angled with respect to first side 95 of end cap 20 to minimize the air resistance of ski carrier 12 encountered in facing forward on a moving vehicle. End cap 20, including handle cap 94, is shown in FIG. 3 with case 14 inserted therein. Handle cap 94 has a cap containment side hole, 102, in a cap containment side surface, 104, and a cap support side hole, 106, in a cap support side surface, 108.

Second side 28 of cover portion 16 is attached to second side 42 of holder portion 18 by a hinge, 110, shown in FIG. 5. Hinge 110 can be a flexible membrane, integrally molded to both cover portion 16 and holder portion 18, a two-part metal hinge with parts screwed into cover portion 16 and holder portion 18, or another suitable type of hinge including one allowing detachment of the portions. Hinge 110 permits cover portion 16 to be positioned with respect to holder portion 18 such that case 14 may be varied between open and closed positions.

When case 14 is in a closed position, cover portion 16 covers holder portion 18 such that lip 34 extends over the edges of first side 40, end 44, and handle portion 46 of holder portion 18. Both strips 74 attached to cover major wall 24 come into contact with any skis 72 in slots 70 and hold those skis in place. In addition, handle portion 32 and handle portion 46 come together to form a single composite handle, 111, shown in FIG. 1.

If case 14 is in the open position, as shown in FIG. 5, the interiors of cover portion 16 and holder portion 18 are exposed. In this open position of case 14, skis 72 may be easily inserted therein or removed therefrom.

End opening 76 in end cap 20 and end opening 96 in handle cap 94 are large enough to permit a first end, 112, or open end, of case 14 to pass therethrough and into end cap 20 if case 14 is in the closed position. If case 14 is inserted a selected one of several predetermined distances into end cap 20, ridges 36 on cover portion 16 and ridges 50 on holder portion 18 will be nestled in corresponding recesses 92 in end cap 20, which, as stated above, aid in holding end cap 20 in place and aligned with case 14. Thus, ski carrier 12 can accommodate different lengths of the longest ski carried therein by selecting one of the discrete distances that first end 112 of case 14 can be inserted into end cap 20 through selecting which ridges 36,50 will be nestled in recesses 92.

Figure 2:
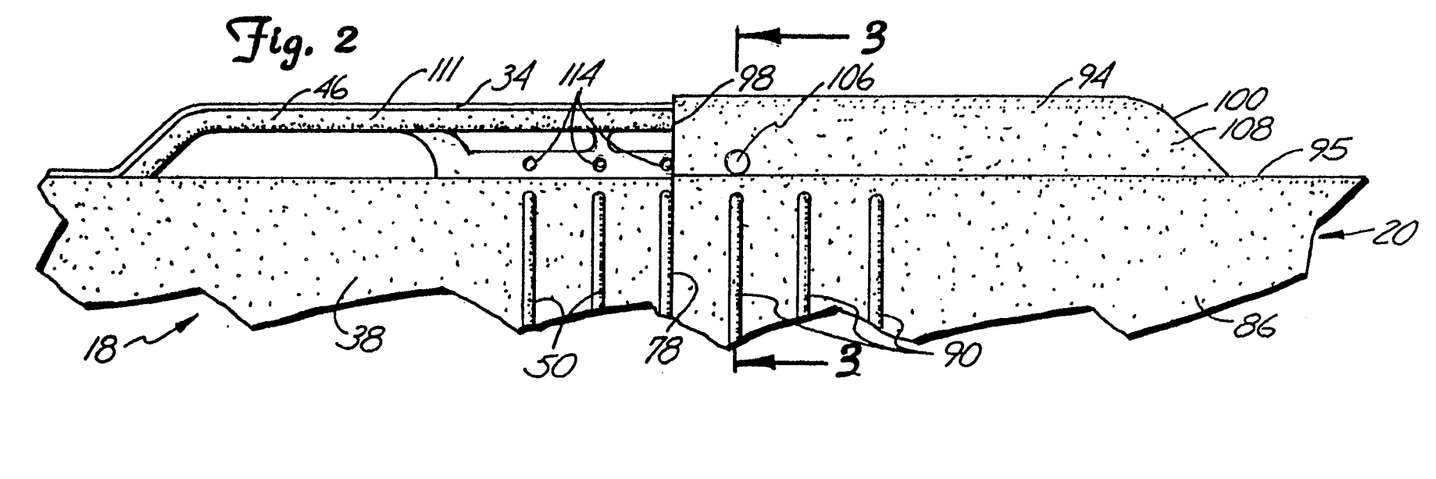
FIG. 2 shows a bottom view of a part of the ski carrier in FIG. 1.

Handle 111, shown in FIG. 2, has a plurality of locking holes, 114, therein spaced along the direction of elongation of cover and holder portions 16 and 18 such that one locking hole 114 will automatically align with cap containment side hole 102 and cap support side hole 106 for each ridge-recess determined discrete distance that first end 112 of case 14 can be inserted into end cap 20. End cap 20 can thus be locked in place to case 14 by a bolt, 116, which is inserted through cap containment side hole 102, the selected locking hole 114, and cap support side hole 106. Bolt 116, having a hole therethrough perpendicular to its long direction axis at the end thereof opposite the head end, can be secured by a lock, 118, as shown in FIG. 3, by having the shackle of lock 118 inserted through the bolt hole. Once end cap 20 is over first end 112 of case 14 and secured thereto, cover portion 16 and holder portion 18 are prevented from opening significantly with respect to each other. Therefore, case 14 will remain closed against accidental opening or intrusion.

Each strap assembly 22 is shown in FIG. 5 and comprises a nylon (or woven metal) strap, 120, two metal hooks, 122, and a tightening buckle, 124, which may be kept within case 14 during airplane or manual transport. To mount ski carrier 12 on a vehicle 10, an end of each strap 120 with its hook 122 is inserted through a corresponding opening 48 in first side 40 of holder portion 18, and the remaining end is inserted through the opposite corresponding opening 48 in second side 42 of holder portion 18. Ski carrier 12 can be placed on vehicle 10 such that case 14 is supported thereon by supports 52 and pads 54. First end 112, or the open end, of case 14 can be oriented such that it is facing forward. Each hook 122 can then be taken from where it emerges from its corresponding opening 48 and extended to hook to a suitable portion of vehicle 10, such as a rain gutter or door frame. Strap 120, tightened using tightening buckle 124, secures each hook 122, and therefore case 14, to vehicle 10. Case 14 can then be closed by closing cover portion 16 against holder portion 18, and end cap 20 can be slid over first end 112 of case 14. End cap 20 is then secured to case 14 using bolt 116.

Locating tightening buckle 124 within case 14 provides a measure of security against ski carrier 12 being removed, as there is no access to tightening buckle 124 when cap 20 is secured to case 14. However, if security is not a problem tightening buckle 24 may be located outside case 14 which would allow quick access to tightening buckle 124 for removal of the case 14 from vehicle 10.

To remove ski carrier 12, so attached, from vehicle 10, end cap 20 is removed from case 14. Case 14 is then opened and strap 120 loosened. All hooks 122 can then be unhooked from vehicle 10 and ski carrier 12 can be removed.

Figure 8:
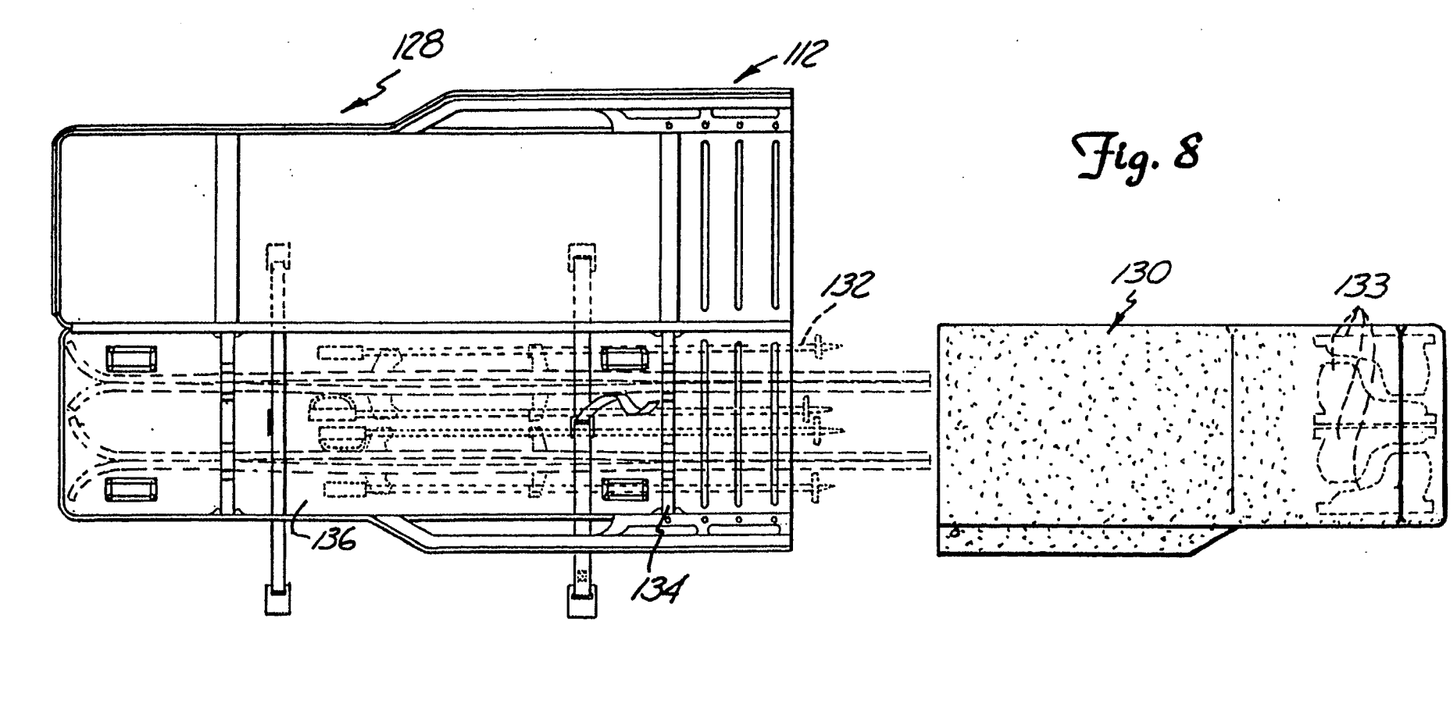
FIG. 8 shows a top view of an alternative embodiment of the present invention.

A first alternative embodiment of ski carrier 12 is shown in FIG. 8. Ski carrier 12 is similar to that described above except that the dimensions of a case, 128, and an end cap, 130, are enlarged to permit ski carrier 12 to hold more equipment, including a number of ski poles, 132, and ski boots, 133. A metal bracket, 134, attached to holder portion, 136, of case 128 is adapted to hold ski poles 132. First end 112 of case 128 is inserted into end cap 130 in the same manner as described above.

Figure 9:
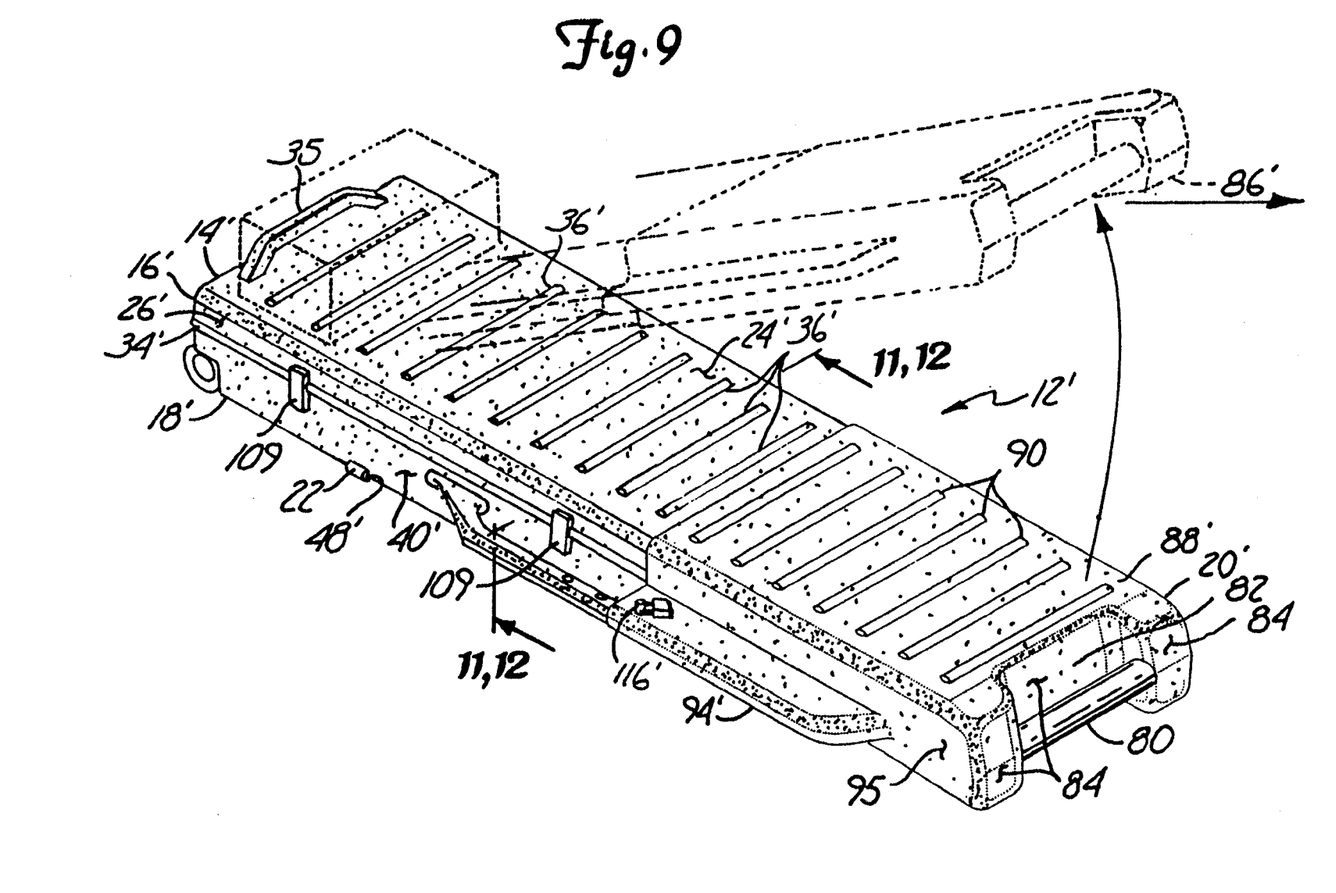
FIG. 9 shows a pictorial view of an alternative embodiment of the present invention.

A further alternative ski carrier, 12', is shown in FIG. 9. Ski carrier 12' comprises a case, 14', having a cover portion, 16', and a holder portion, 18', and further comprises an end cap, 20'. Again, the same two strap assemblies 22 are provided but are not shown fully deployed. As before, cover portion 16', holder portion 18', and end cap 20' are each fabricated from a suitable molded polymer.

Figure 10:
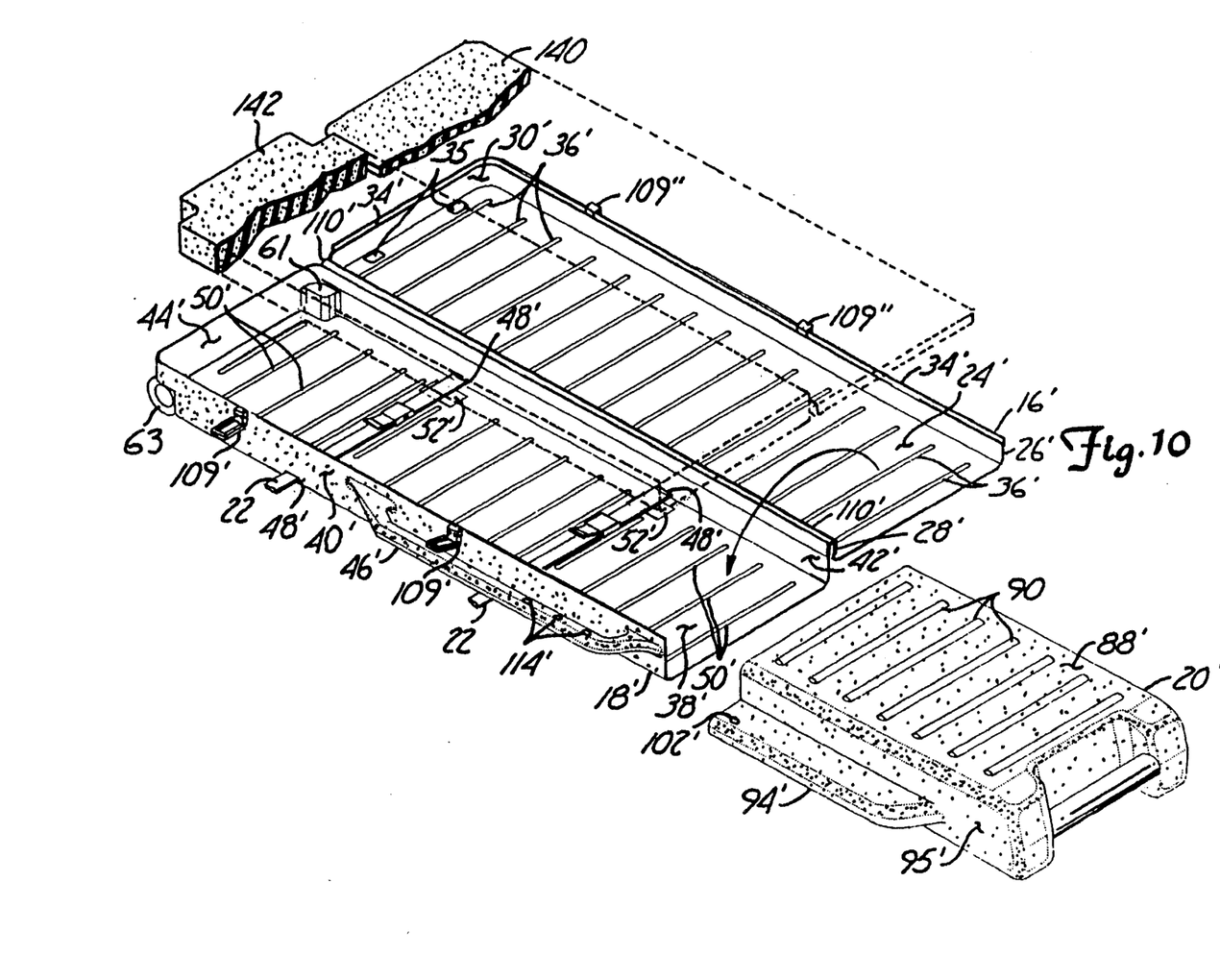
FIG. 10 shows a pictorial view of the alternative embodiment of FIG. 9 with the case portion in an open position.

Cover portion 16' and holder portion 18' of case 14' are shown attached to one another in the side-by-side presentation thereof provided in FIG. 10. Cover portion 16' of case 14' again has the general shape of an elongated, open top container having a generally rectangular shape with a missing end, and is formed from a cover major wall, 24', of that general shape and a first side, 26', a second side, 28', and an end, 30', joined more or less perpendicularly thereto at the outer boundaries thereof. A lip portion, 34', extends in cover portion 16' a bit outward beyond the rest of first side 26' and end 30' in forming the longest free edges of that side and end. There is no end structure between first side 26' and second side 28' at the end of cover portion 16' opposite end 30' so that an open end results at this location in cover portion 16'. A raised end protrusion, 35, projects outwardly from major surface 24' adjacent end 30' to serve as both a stop and a handle. Again, a plurality of outwardly protruding, equally spaced, elongated parallel ridges, 36', are molded into major wall 24' of cover 16' such that there are recesses in the inner surface thereof, these ridges extending perpendicularly between first side 26' and second side 28'.

Holder portion 18' of case 14' again has substantially the same top view size as cover portion 16', and so again has the general shape of an elongated container having a generally rectangular shape with a missing end, but is of greater depth than is cover portion 16'. Holder portion 18' includes a holder major wall, 38', of a generally rectangular shape and a first side, 40', a second side, 42', and an end, 44', extending generally perpendicularly from the boundaries thereof. At the opposite end, there is no end structure provided across major wall 38' between first side 40' and second side 42' opposite end 44' with the result again of leaving an open end in holder portion 18'. A handle, 46' protrudes from and extends along first side 40' Of holder portion 18'. First side 40' and second side 42' of holder portion 18' each have two openings, 8', therein located such that those openings 48' in first side 40' are located directly opposite corresponding openings 48' in second side 42'. A plurality of outwardly protruding, equally spaced, elongated parallel ridges, 50', are molded into holder major wall 38' such that there are recesses in the inner surface thereof. Ridges 50' extend perpendicular to both first side 40' and second side 42'.

A plurality of supports, 52', that are outwardly protruding and slope sided, and have generally rectangularly shaped bottoms, are molded as parts of major holder wall 38'. Supports 52' are seen from the top in FIG. 10, but can be more fully from the views shown in FIGS. 11 and 12. Each of supports 52' (there are four of them) has a pad, 54', attached to an outer surface, 56', at the bottom of that support, and each has a hole, 58', therethrough to permit liquid such as melted snow to drain from holder portion 18' of case 14' if that portion is oriented to be between cover portion 16' and earth such that a hole is at a relatively low point.

A pair of wheel spaces are provided in holder portion 18' through providing notches at the bottom portions of the opposite ends of end 44', and at the bottom portions of sides 40' and 42' where they meet end 44', and at the opposite corners of major wall 38' where it meets first side 40' and where it meets second side 42'. That is, these notches are provided in these holder members at what would be the corners of holder portion 18' at end 44' thereof where these members would intersect in the absence of such wheel spaces. Each of these wheel spaces is completed by a three-sided wheel well structure, 61, which completes the wheel space by joining the corresponding edges of the notches in major surface 38', end 44' and the corresponding side. Thus, one of structures 61 is also joined with first side 40' and the other is also joined with second side 42'. A pair of wheels, 63, are provided in each of these wheel spaces, these wheels being fastened to the side of the corresponding three-sided wheel well structure which is approximately parallel to the corresponding one of first and second sides 40' and 42'. Wheels 63 allow ski carrier 12' to be lifted at the end of ski carrier 12' opposite the end thereof having wheels 63 so that the carrier can be moved across a surface on rotating wheels that will bear a significant fraction of the weight of that ski carrier and its contents.

End cap 20' is shown assembled as part of completely closed ski carrier 12' in FIG. 9, but is shown separately and unassembled with open case 14' in FIG. 10. End cap 20' again has generally the shape of a somewhat elongated container enclosing an interior space on all sides except an end thereof which has an opening (not shown) in the unitary structure material forming that end so that this cap can be slipped over case 14' when that case is closed (that is, having cover portion 16' fully over and against holder portion 18' to enclose an interior space therebetween). A handle, 80, is provided across a recess, 82, in an end, 84, of end cap 20' opposite that having the opening therein such that this handle extends across much of this end. Handle 80 can conveniently be used in connection with moving ski carrier 12' across a surface on wheels 63 as indicated by the dashed line representation of the raised cap end of ski carrier 12' shown in FIG. 9. A support major surface, 86', of end cap 20' is not shown in the figures but is formed much like support surface 86 of ski carrier 12 as shown in FIG. 4. Again, ribs and supports are molded to form part of major surface 86', and a pad is attached to the bottom surface of outwardly protruding supports with an opening provided in such supports to permit liquid such as melted snow to drain out of end cap 20' if suitably oriented.

A containment major wall, 88', of end cap 20' can be seen in FIGS. 9 and 10. Again, a plurality of outwardly protruding, equally spaced, elongated parallel ridges, 90, are molded as part of wall 88' such that there are recesses in the interior surface of that wall. As indicated above, similar ridges are molded as part of support major wall 86 so that there are recesses therein in the interior surface of that wall across from the similar recesses in end cap containment major wall 88'. These interior recesses inside end cap 20' permit receiving those ridges 36' in cover portion 16' and ridges 50' in holder portion 18' to have them nested therein if end cap 20' is slid over the open ends of these cover and holder portions to thereby tend to keep end cap 20' aligned with closed case 14'.

A handle cap or shroud, 94', is shown in FIGS. 9 and 10 protruding from a first side, 95', of end cap 20' to accommodate therein handle 46' of holder portion 18' by effectively adding to the interior space of end cap 20'. Thus, a part of handle 46' can be received in handle cap 94' for ski carrier 12' much as handle cap 94 in FIG. 4 receives therein handle portions 32 and 46 for ski carrier 12. A pair of holes on opposite sides of handle cap 94, toward the case end thereof, are provided directly across from one another, one of this pair of holes, 102', being seen in FIG. 10.

First side 26' of cover portion 16' is attachable to, and detachable from, first side 40' of holder portion 18' if case 14' is closed by a pair of latches, 109, as shown in FIGS. 9, 10, 11 and 12. Each of latches 109 has a latching buckle, 109', mounted on holder portion 18' and a corresponding keeper, 109", mounted on cover portion 16'.

Figure 11:
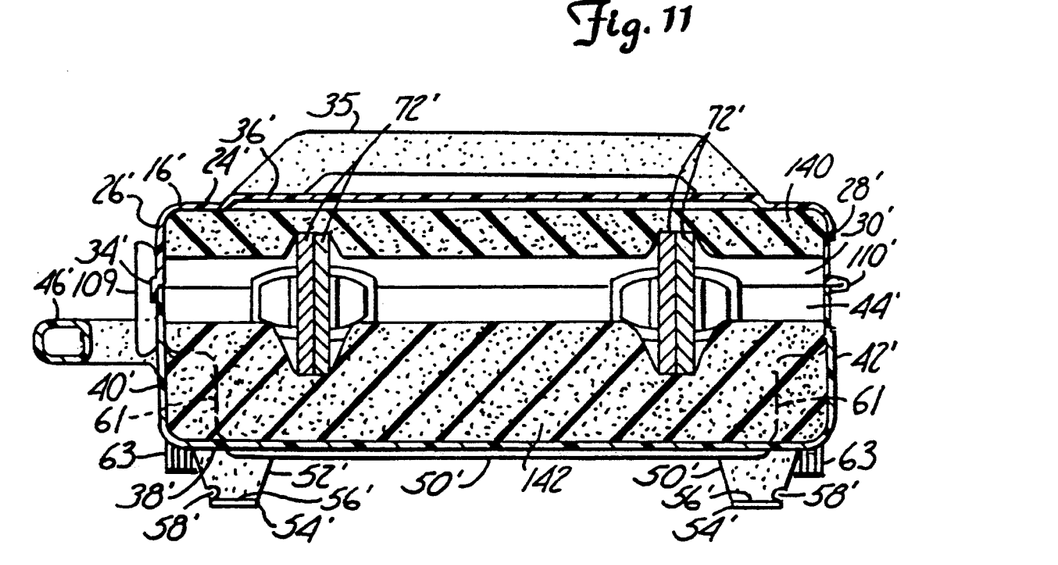
FIG. 11 shows a cross sectional view of the case portion taken along the line 11—11 of FIG. 9.
Figure 12:
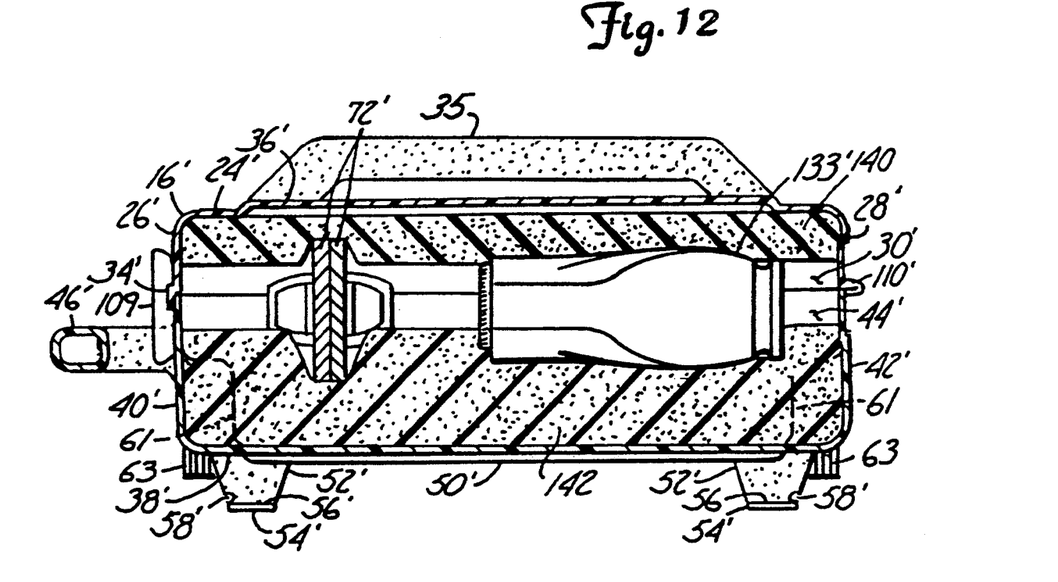
FIG. 12 shows a cross sectional view of the case portion taken along the line 12—12 of FIG. 9.

In addition, second side 28' of cover portion 16' is attached to second side 42' of holder portion 18' whether case 14' is open or closed by a hinge, 110', as can be seen in FIGS. 10, 11 and 12. Here, hinge 110' is shown as a flexible membrane integrally molded to both cover portion 16' and holder portion 18'. Hinge 110' again permits cover portion 16' to be positioned with respect to holder portion 18' such that case 14' may be varied between open and closed positions.

If case 14' is in a closed position, cover portion 16' covers holder portion 18' such that lip 34' extends over the edges of first side 40' and end 44' of holder portion 18'. If case 14' is in the open position, as shown in FIG. 10, the interiors of cover portion 16' and holder portion 18' are exposed to permit the insertion of skis or other equipment therein, or the removal of same therefrom.

Any such inserted skis are held by a closed case 14' between two foam liners, a thinner foam liner, 140, which fits into the interior of cover portion 16', and a thicker foam liner, 142, which fits into the interior of holder portion 18'. Liners 140 and 142 are shown in dashed line form in FIG. 10. Back-to-back skis, 72', are stored in the interior of case 14', there being two such pairs shown in FIG. 11 and a single pair shown in FIG. 12. In place of a second pair of skis 72' in FIG. 12, there is instead shown one, 133', of a pair of boots enclosed in the interior of case 14' with the back thereof shown in the cross section view of that Figure. No cutouts, partial material removals, slits, or other changes are required within either of foam liners 140 and 142 to accommodate and securely hold either skis or boots. However, such treatments of these foam liners can make such accommodations more convenient. The depressions shown in these foam liners due to the skis and boots enclosed by them are sufficient to keep such items in the desired location within case 14'.

As with ski carrier 12, the closing of case 14' permits inserting same into the opening at an end of end cap 20' described above so as to accommodate different lengths of skis protruding out the open end of case 14'. Again, this accommodation is accomplished by a sequence of locking holes, 114', provided along the length of handle 46' at the end cap end thereof. The aligning of hole 102' in end cap 20' with one of holes 114' in handle 46' of holder 18' permits a bolt, 116', to be inserted through these holes so as to stick out past both sides of cap 94' so that end cap 20' can be locked to case 14' if the bolt has a head on one end and the shackle of a lock passed through a hole in a bolt on the opposite end thereof as with ski carrier 12. Alternatively, a lock with a sufficiently long shackle can have that shackle inserted in place of bolt 116' and locked directly to secure end cap 20' to case 14'.

Insertion of a closed case 14' into end cap 20' again has the effect of preventing case 14' from being opened. This follows because of the single-piece, or unitary, construction of end cap 20' about the opening therein through the polymer material at an end thereof, as described above, which provides a rigid, unitary wall about case 14' at least at the open end of end cap 20'. Small openings may be provided elsewhere in end cap 20' to permit inserting objects therein without the necessity of removing end cap 20' from about case 14' and without compromising the security of skis and boots positioned in case 14' insofar as being removed therefrom.

Strap assemblies 22 for ski carrier 12' will operate just as strap assemblies 22 operate in connection with ski carrier 12. The straps again extend through holes 48', and between major wall 38' and foam liner 142.

Figure 13:
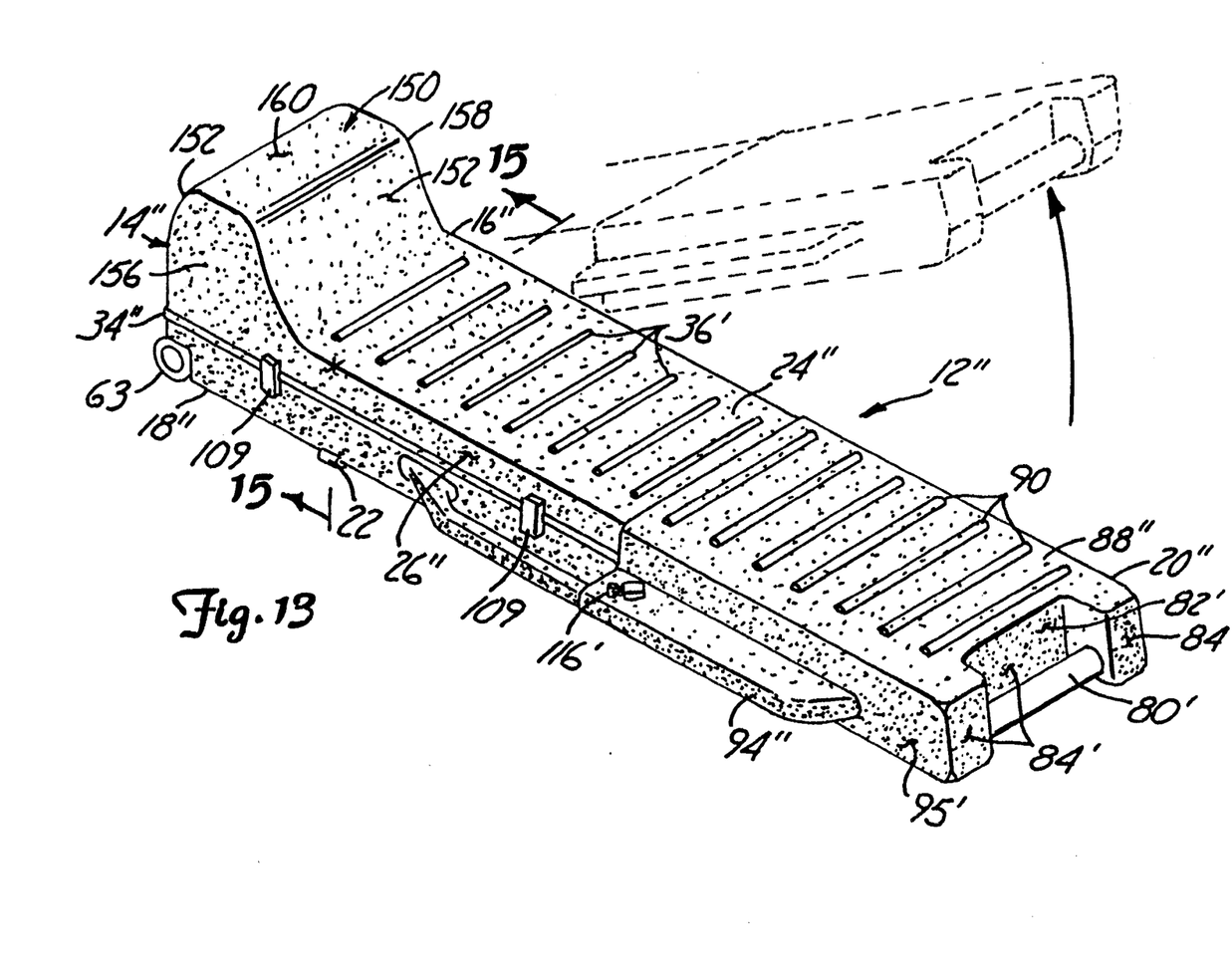
FIG. 13 shows a pictorial view of an alternative embodiment of the present invention.
Figure 14:
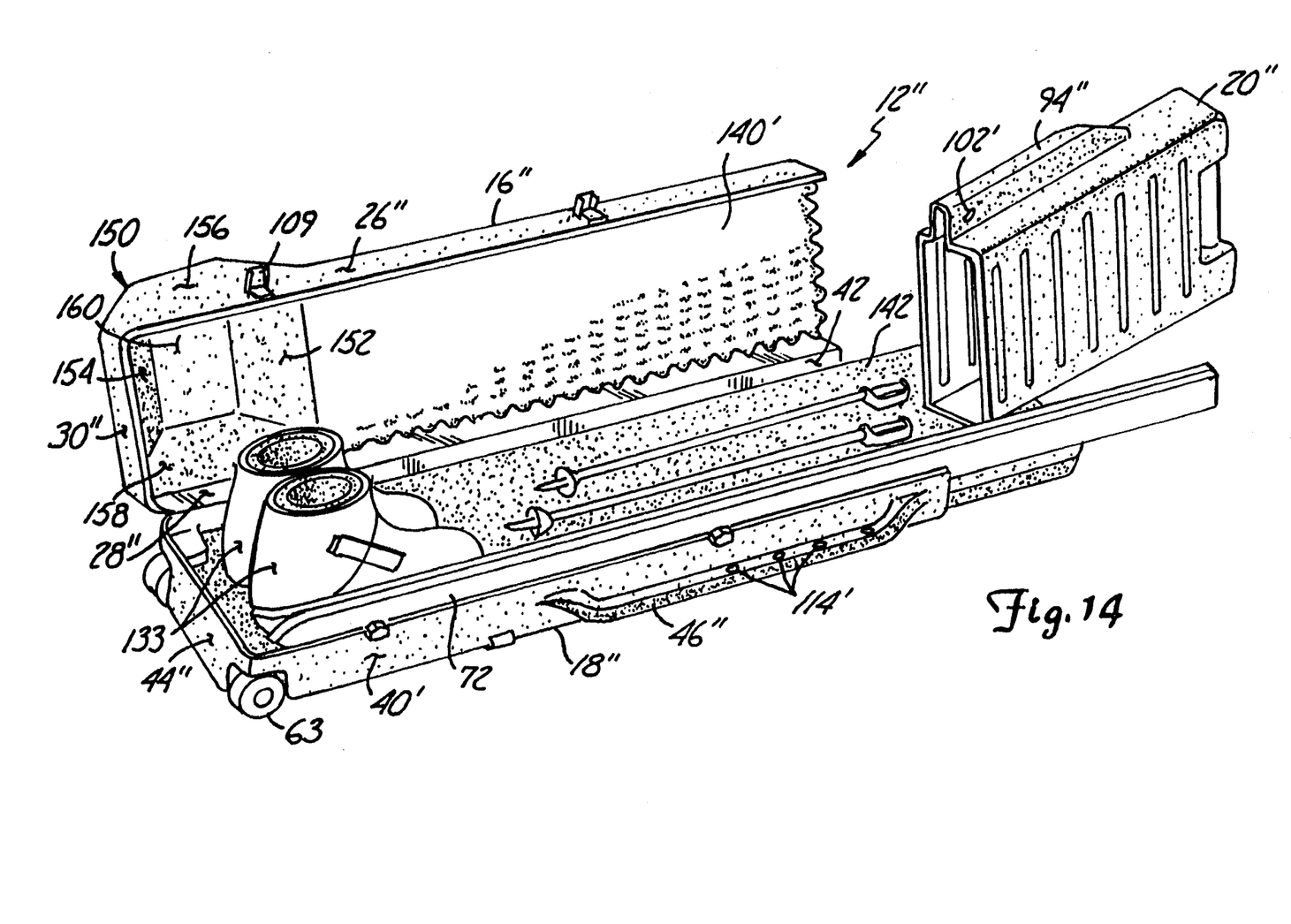
FIG. 14 shows a pictorial view of the alternative embodiment of FIG. 13 with the case portion in an open position.
Figure 15:
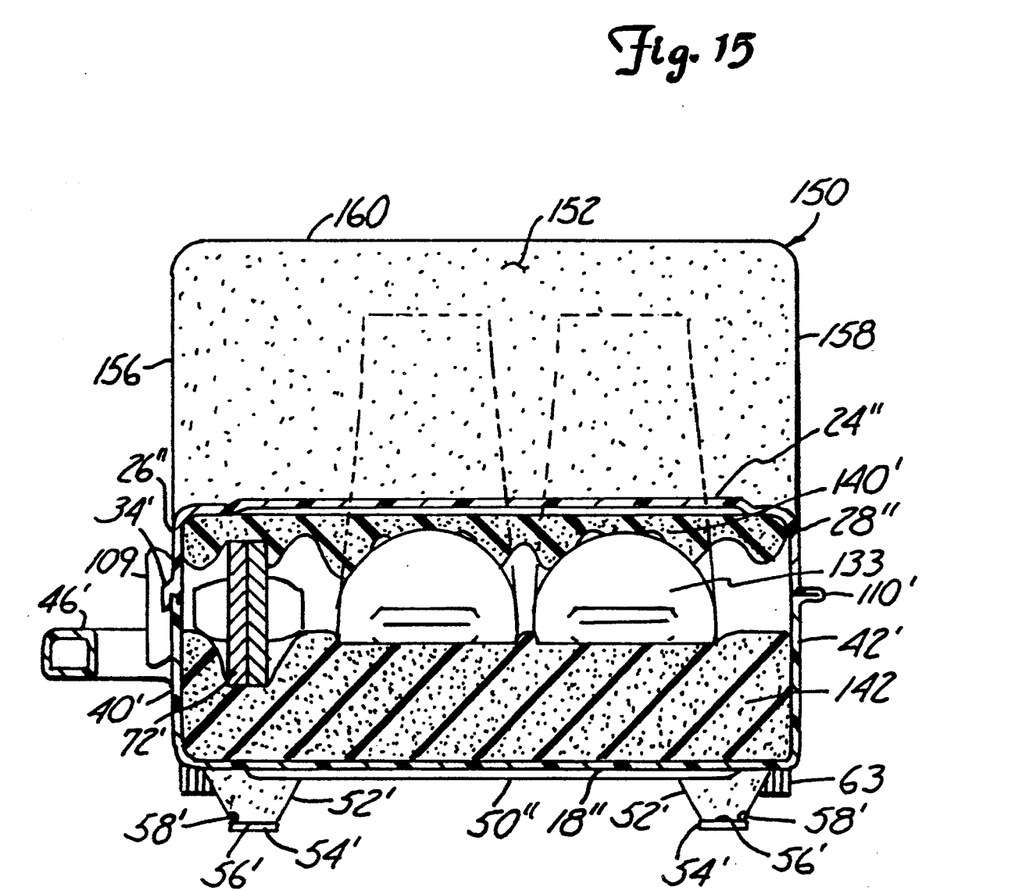
FIG. 15 shows a cross-sectional view of the case portion taken along line 15—15 of FIG. 13.

A further alternative ski carrier, 12' is shown in FIGS. 13-15. Ski carrier 12" comprises a case, 14", having a cover portion, 16", and a holder portion, 18", and further comprises an end cap, 20". Ski carrier 12" is similar to the carrier 12' described above with two exceptions. First, the widths of case 14" and end cap 20" (FIG. 15) are reduced compared to the widths of case 14' and end cap 20' of carrier 12' (FIG. 11) to permit easier handling. Second, cover portion 16" includes a supplemental enclosure portion, 150, extending outward therefrom to form a cavity in communication with the interior space of case 14" for upright storage of a pair of ski boots 133.

Cover portion 16" includes a first side, 26", a second side, 28", an end, 30", and a cover major wall, 24", and supplemental enclosure 150 is integrally constructed therewith. Supplemental enclosure 150 includes a front, 152, extending outward from remaining portions of cover major wall 24" and a back, 154, extending outward from remaining portions of the end wall 30, front 152 and back 154 being rounded to reduce wind resistance when the ski carrier 12" is mounted on a vehicle. Supplemental enclosure 12" also includes a side, 156, extending outward from remaining portions of first side 26", and a side, 158, extending outward from remaining portions of second side 28", sides 156 and 158 being substantially in the same plane as first side 26" and second side 28" respectively. Supplemental enclosure 150 includes a top, 160, joining front 152, back 154, and sides 156 and 158 together and is substantially parallel to major wall 24".

Cover portion 16" is lined with a foam liner, 140', and holder portion 18" is lined with foam liner 142 for holding skis 72 in place when case 14" is closed. The interior of supplemental enclosure 150 is lined with an extended portion of foam liner 140' to accommodate and cushion ski boots 133. As shown in FIGS. 14 and 15, ski boots 133 are positioned in supplemental enclosure 150 such that the toe of the each ski boot faces the open end of cover portion 16", and such that each toe extends beyond the supplemental enclosure 150 so that the toes can be engaged and held in place between foam liners 140' and 142. In other words, foam liners 140' and 142 exert, respectively, downward and upward frictional forces on the toe of each ski boat 133 when cover portion 16" is closed, thereby securing ski boots 133 in place for transport of ski carrier 12".

Although the present invention has been described with reference to preferred embodiments, workers skilled in the art will recognize that changes may be made in form and detail without departing from the spirit and scope of the invention.

What is claimed is:

1. A carrier for holding elongated objects and suitable for being alternatively transported by carrying and by vehicular mounting, said carrier comprising:

an openable case means comprising a cover portion and a holder portion, said cover portion being positionable with respect to said holder portion to thereby permit closing said case means about an interior space formed therein and to permit opening said case means to expose said case interior space, said case means having a case opening therein at a case first end to provide access to said case interior space when said cover portion and said holder portion are in a closed position and being elongated along an axis therein passing through said case opening;

an end cap means having a cap first end of unitary construction with a cap opening therein to provide access to a cap interior space and being elongated along an axis therein passing through said cap opening, said cap opening having sufficient dimensions to permit said first end of said case means to pass therethrough and enter said cap interior space when said cover portion of said case means is positioned with respect to said holder portion of said case means to substantially dose said case means so as to thereby maintain said cover portion and said holder portion in said closed position;

a securing means for securing said end cap means to said case means with said case first end extending a selected distance through said cap opening into said cap interior space; and a pair of wheels adjacent an end of said case means opposite said case first end.

2. The apparatus of claim 1 wherein said holder portion of said case means has a plurality of openings therein through which a fastening means can be inserted to extend to a vehicle to permit attaching said case means to that vehicle.

3. The apparatus of claim 2 wherein said fastening means comprises a first belt having a first end and a second end, a tightening means for tightening said first belt, and hooks on each of said first and second ends of said first belt.

4. The apparatus of claim 1 wherein the distance that said case first end extends through said cap opening into said cap interior space is selectable.

5. The apparatus of claim 4 wherein said cover portion has a cover major outer surface having a plurality of cover ridges thereon, said holder portion has a holder major outer surface having a plurality of holder ridges thereon, and said end cap means has first and second cap major inner surfaces each having a plurality of elongated recesses therein in a corresponding ones of which said cover ridges and said holder ridges can be nestled.

6. The apparatus of claim 5 wherein each of said recesses nestles a different one of said ridges for each selected distance that said case first end extends through said cap opening.

7. The apparatus of claim 1 wherein said cover and holder portions of said case means are joinable and at least partially separable such that said cover portion can be positioned with respect to said holder portion to alternatively enclose and expose said case interior space if removed from said end cap.

8. The apparatus of claim 7 wherein said end cap means has a pair of cap locking holes therein and said case means has a plurality of case locking holes therein that can be aligned with said cap locking holes when said case means is closed with said first end thereof in said cap interior space, and said securing means comprising an object capable of being inserted through said aligned cap and case locking holes.

9. The apparatus of claim 8 wherein said case locking holes are positioned such that one of said case locking holes aligns with said cap locking holes for each selected distance that said case first end extends through said cap opening.

10. The apparatus of claim 1 wherein said end cap means has a handle adjacent an end thereof opposite said cap first end.

11. The apparatus of claim 10 wherein said case means has a pair of major surfaces, one in said cover portion and one in said holder portion, and that one of said pair of major surfaces farther from said pair of wheels having a protrusion outward therefrom adjacent said end of said case means opposite said case first end.

12. The apparatus of claim 1 wherein said case means has a pair of major surfaces, one in said cover portion and one in said holder portion, and that one of said pair of major surfaces farther from said pair of wheels having a protrusion outward therefrom adjacent said end of said case means opposite said case first end.

13. The apparatus of claim 1 wherein said holder portion has a holder major inner surface having a foam liner positioned thereon for holding said elongated objects in place.

14. The apparatus of claim 13 wherein said cover portion has a cover major inner surface having a foam liner positioned thereon for holding said elongated objects in place.

15. The apparatus of claim 1 wherein said case means has an outwardly extending supplemental enclosure forming a cavity in communication with said case interior space.

16. A ski carrier for holding skis and suitable for being alternatively transported by carrying and by vehicular mounting, said ski carrier comprising:
an openable case means comprising a cover portion and a holder portion, said cover portion being positionable with respect to said holder portion to thereby permit closing said case means about an interior space formed therein and to permit opening said case means to expose said case interior space, said case means having a case opening therein at a case first end to provide access to said case interior space when said cover portion and said holder portion are in a closed position and being elongated along an axis therein passing through said case opening;
an end cap means having a cap first end of unitary construction with a cap opening therein to provide access to a cap interior space and being elongated along an axis therein passing through said cap opening, said cap opening having sufficient dimensions to permit said first end of said case means to pass therethrough and enter said cap interior space when said cover portion of said case means is positioned with respect to said holder portion of said case means to substantially close said case means so as to thereby maintain said cover portion and said holder portion in said closed position; and
a holder major inner surface on said holder portion having a foam liner thereon for holding said skis in place.

17. The apparatus of claim 16 wherein said cover portion has a cover major inner surface having a foam liner positioned thereon for holding said skis in place.

18. The apparatus of claim 16 wherein said holder portion of said case means has a plurality of openings therein through which a fastening means can be inserted to extend to a vehicle to permit attaching said case means to that vehicle.

19. The apparatus of claim 18 wherein said fastening means comprises a first belt having a first end and a second end, a tightening means for tightening said first belt, and hooks on each of said first and second ends of said first belt.

20. The apparatus of claim 19 wherein the distance that said case first end extends through said cap opening into said cap interior space is selectable.

21. The apparatus of claim 20 wherein said cover portion has a cover major outer surface having a plurality of cover ridges thereon, said holder portion has a holder major outer surface having a plurality of holder ridges thereon, and said end cap means has first and second cap major inner surfaces each having a plurality of elongated recesses therein in a corresponding ones of which said cover ridges and said holder ridges can be nestled.

22. The apparatus of claim 21 wherein each of said recesses nestles a different one of said ridges for each selected distance that said case first end extends through said cap opening.

23. The apparatus of claim 16 wherein said cover and holder portions of said case means are joinable and at least partially separable such that said cover portion can be positioned with respect to said holder portion to alternatively enclose and expose said case interior space if removed from said end cap.

24. The apparatus of claim 23 wherein said end cap means has a pair of cap locking holes therein and said case means has a plurality of case locking holes therein that can be aligned with said cap locking holes when said first end of said case means is closed and extended into in said cap interior space, and wherein said case locking holes are positioned such that one of said case locking holes aligns with said cap locking holes for each selected distance that said case first end extends through said cap opening.

25. The apparatus of claim 16 wherein said case means has an outwardly extending supplemental enclosure forming a cavity in communication with said case interior space.

26. A transport carrier to hold elongated items for being alternatively transported by carrying and by vehicular mounting, said transport carrier comprising:
an openable case means comprising a cover portion and a holder portion, said cover portion being positionable with respect to said holder portion to thereby permit closing of said case means about an interior space formed therein and to permit opening of said case means to expose said case interior space, said case means having a case opening therein at a case first end to provide access to said case interior space when said cover portion and said holder portion are in a closed position and being elongated along an axis therein passing through said case opening;

an end cap means having a cap first end of substantially rigid unitary construction with a cap opening therein to provide access to a cap interior space and elongated along an axis therein passing through said cap opening, said cap opening having sufficient dimensions to permit said first end of said case means to pass therethrough and enter said cap interior space when said cover portion of said case means is positioned with respect to said holder portion of said case means to substantially close said case means so as to thereby maintain said cover portion and said holder portion in said closed position; and a securing means for securing said end cap means to said case means with said case first end extending a selected distance through said cap opening into said cap interior space.

27. The apparatus of claim 26 wherein said holder portion of said case means has a plurality of openings therein through which a fastening means can be inserted to extend to a vehicle to permit attaching said case means to that vehicle.

28. The apparatus of claim 26 wherein that distance that said case first end extends through said cap opening into said cap interior space is selectable.

29. The apparatus of claim 28 wherein said cover portion has a cover major outer surface having a plurality of cover ridges thereon at an angle to said case means axis of elongation, said holder portion has a holder major outer surface having a plurality of holder ridges thereon at an angle to said case means axis of elongation, and said end cap means has first and second cap major inner surfaces opposing one another wherein each second cap major surface has a plurality of elongated recesses therein in corresponding relation with said cover ridges and said holder ridges such that said recesses and said ridges can be nestled.

30. The apparatus of claim 26 wherein said cover and holder portions of said case means are joinable and at least partially separable such that said cover portion can be positioned with respect to said holder portion to alternatively enclose and expose said case interior space when free of said end cap.

31. The apparatus of claim 26 wherein said cover and holder portions of said case means are rotatably attached such that said cover portion can be positioned with respect to said holder portion to alternatively enclose and expose said case interior space when free of said end cap.

* * * * *